(12) United States Patent
Browne et al.

(10) Patent No.: US 9,379,781 B1
(45) Date of Patent: Jun. 28, 2016

(54) SERVER INVENTORY OF NON-ELECTRONIC COMPONENTS

(71) Applicant: LENOVO ENTERPRISE SOLUTIONS (SINGAPORE) PTE. LTD., Singapore (SG)

(72) Inventors: Jason A. Browne, Apex, NC (US); Matthew A. Steele, Durham, NC (US); Edward S. Suffern, Chapel Hill, NC (US); Andrew H. Wray, Hillsborough, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/642,834

(22) Filed: Mar. 10, 2015

(51) Int. Cl.
*H04B 5/00* (2006.01)
*H04L 12/24* (2006.01)

(52) U.S. Cl.
CPC ............ *H04B 5/0056* (2013.01); *H04B 5/0043* (2013.01); *H04L 41/0677* (2013.01)

(58) Field of Classification Search
USPC ............................ 455/41.1, 41.2, 41.3; 726/4
See application file for complete search history.

(56) References Cited

U.S. PATENT DOCUMENTS

| | | | |
|---|---|---|---|
| 8,090,256 B2 | 1/2012 | Reisslein et al. | |
| 2008/0296373 A1* | 12/2008 | Zmood | A61B 19/44 235/385 |
| 2011/0282476 A1* | 11/2011 | Hegemier | G06Q 30/0621 700/100 |
| 2013/0024178 A1 | 1/2013 | Kumaragurunathan | |
| 2013/0127980 A1* | 5/2013 | Haddick | G06F 3/013 348/14.08 |
| 2013/0202207 A1 | 8/2013 | Ryu | |
| 2013/0227653 A1* | 8/2013 | Choi | H04L 67/02 726/4 |
| 2013/0339151 A1 | 12/2013 | Bottine et al. | |
| 2014/0012954 A1 | 1/2014 | Dorn et al. | |
| 2014/0068719 A1 | 3/2014 | Kiukkonen et al. | |
| 2014/0085090 A1 | 3/2014 | Yeo | |
| 2014/0244017 A1* | 8/2014 | Freiwirth | B33Y 50/00 700/100 |
| 2014/0279294 A1* | 9/2014 | Field-Darragh | G06Q 10/087 705/28 |
| 2015/0145980 A1* | 5/2015 | Bryll | G02B 21/241 348/79 |

FOREIGN PATENT DOCUMENTS

WO    WO2010116042 A1    10/2010

OTHER PUBLICATIONS

M. Koskela et al., "A Framework for Integration of Radio Frequency Identification and Rich Internet Applications", Int. Conf. on Information Technology Interfaces, Jun. 25-28, 2007, pp. 691-295.

* cited by examiner

*Primary Examiner* — Ganiyu A Hanidu
(74) *Attorney, Agent, or Firm* — Law Office of Jim Boice

(57) ABSTRACT

A system contains one or more non-electronic components, each of which has a near field communication (NFC) identification chip attached thereon and/or associated therewith. A non-electronic component inventory controller identifies the non-electronic components in the system by interrogating the NFC identification chips with an NFC electromagnetic field that is emitted an NFC electromagnetic field emitter.

16 Claims, 8 Drawing Sheets

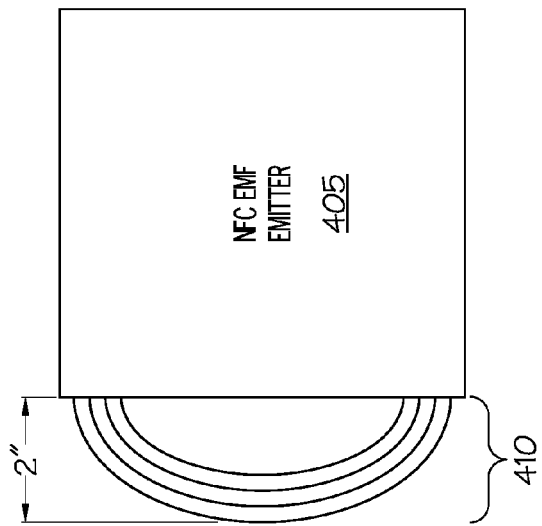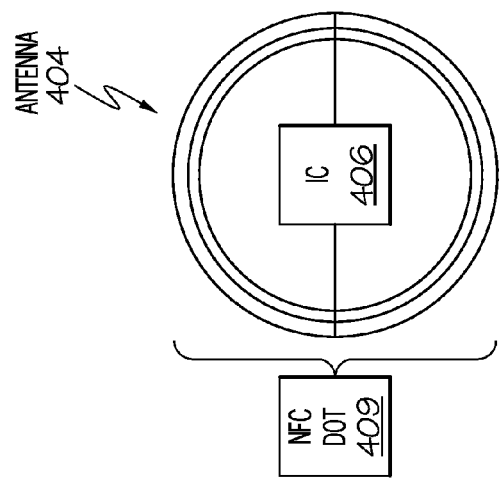
FIG. 4

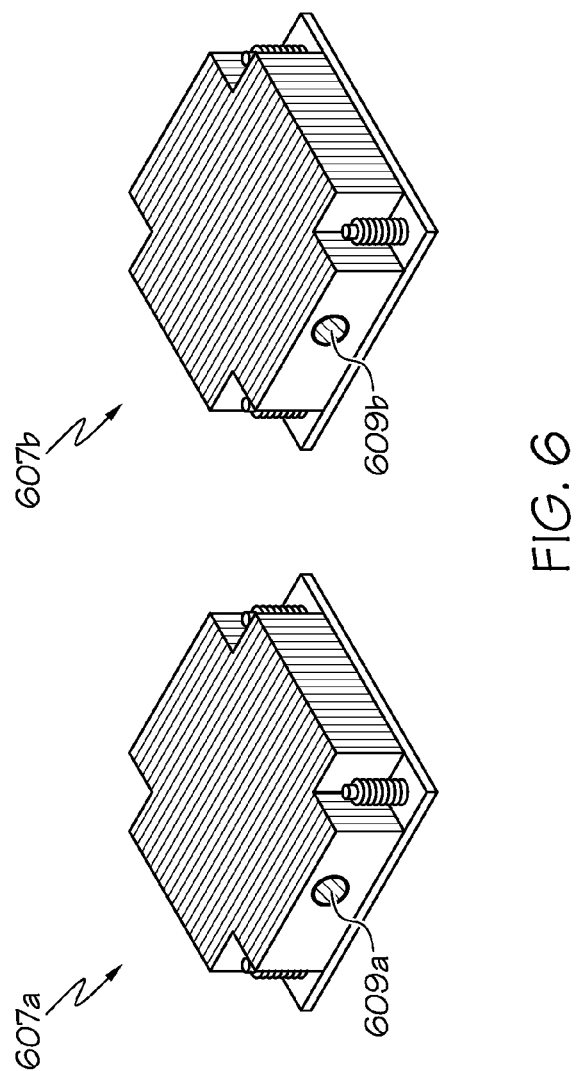

| ELECTRONIC COMPONENT | REQUIRED PASSIVE COMPONENT | ADDITIONAL PASSIVE COMPONENT |
|---|---|---|
| 130W PROCESSOR | HEAT SINK TYPE 2 | PROCESSOR BAFFLE |
| 115W PROCESSOR | HEAT SINK TYPE 1 | |
| 90W PROCESSOR | HEAT SINK TYPE 1 | |
| 70W PROCESSOR | HEAT SINK TYPE 1 | |
| 4 GB DIMM | DIMM BAFFLE 1 | |
| 8 GB DIMM | DIMM BAFFLE 1 | |
| 16 GB DIMM | DIMM BAFFLE 1 | |
| 32 GB DIMM | DIMM BAFFLE 2 | HEAT SINK CLIP |
| 200 GB 2.5" HDD | N/A | |
| 400 GB 2.5" HDD | N/A | |
| 800 GB 2.5" HDD | N/A | |
| 1 TB 3.5" SATA HDD | N/A | |
| 4 TB 3.5" SATA HDD | N/A | |
| 6 TB 3.5" SATA HDD | N/A | |
| 100 GB 2.5" SSD | EXTENDER CABLE | |
| 200 GB 2.5" SSD | EXTENDER CABLE | |
| 400 GB 2.5" SSD | EXTENDER CABLE | |
| 275W GPGPU | 8 PIN POWER CABLE | |
| 250W GPGPU | 8 PIN POWER CABLE | |
| 200W GPGPU | 6 PIN POWER CABLE | |

701

| ELECTRONIC COMPONENT | REQUIRED PASSIVE COMPONENT | ADDITIONAL PASSIVE COMPONENT |
|---|---|---|
| 130W PROCESSOR | HEAT SINK TYPE 2 | PROCESSOR BAFFLE |
| 130W PROCESSOR | HEAT SINK TYPE 2 | |
| 8 GB DIMM | DIMM BAFFLE 1 | |
| 8 GB DIMM | | |
| 8 GB DIMM | | |
| 8 GB DIMM | | |
| 8 GB DIMM | | |
| 8 GB DIMM | | |
| 400 GB 2.5" HDD | N/A | |
| 400 GB 2.5" HDD | N/A | |
| 100 GB 2.5" SDD | EXTENDER CABLE | |
| 100 GB 2.5" SDD | | |
| 250W GPGPU | 8 PIN POWER CABLE | |
| 250W GPGPU | 8 PIN POWER CABLE | |

SERVER INVENTORY OF NON-ELECTRONIC COMPONENTS

BACKGROUND

The present disclosure relates to the field of electronic devices, and specifically to computational electronic devices such as servers. Still more particularly, the present disclosure relates to inventorying components within a server by a management controller or similar device.

A baseboard management controller (BMC) can inventory the electronic components within a server to determine the configuration of the server. However, a BMC relies on identification messages from the components, which are produced electronically. Therefore, the BMC is unable to inventory passive (i.e., non-electronic) components such as heat sinks, baffles and non-electrically identifiable cables.

This is particularly a problem when the wrong heatsink is installed on a processor or if a baffle is missing. This is also a problem if the wrong internal power cable is installed for high power general-purpose computing on graphics processing units (GPGPU) and similar devices that require extra power. The normal manufacturing test is not run long enough for a failure to determine the server was built incorrectly.

SUMMARY

In an embodiment of the present invention, a system contains one or more non-electronic components, each of which has a near field communication (NFC) identification chip attached thereon and/or associated therewith. A passive component inventory controller identifies the non-electronic components in the system by interrogating the NFC identification chips, which are affixed to the non-electronic components, with an NFC electromagnetic field that is emitted from an NFC electromagnetic field emitter.

In an embodiment of the present invention, a method and/or computer program product inventories non-electronic components of an electronic device. A near field communication (NFC) emitter within a non-electronic component inventory controller emits an NFC electromagnetic field. The non-electronic component inventory controller inventories non-electronic components of the electronic device. An NFC receiver within the passive component inventory controller receives an identification signal, which is generated by an NFC identification chip that is affixed to a specific non-electronic component within an electronic device, in response to the NFC electromagnetic field inducing a current in the NFC identification chip to cause a transmission of the identification signal from the NFC identification chip.

BRIEF DESCRIPTION OF THE DRAWINGS

FIG. 4 illustrates a functional relationship between an NFC dot and an NFC electromagnetic field emitter;

FIG. 6 depicts two non-electronic heat sinks tagged with different NFC dots;

FIG. 7 depicts tables of non-electronic (passive) components scheduled to be within a particular electronic device.

DETAILED DESCRIPTION

Figure 1:
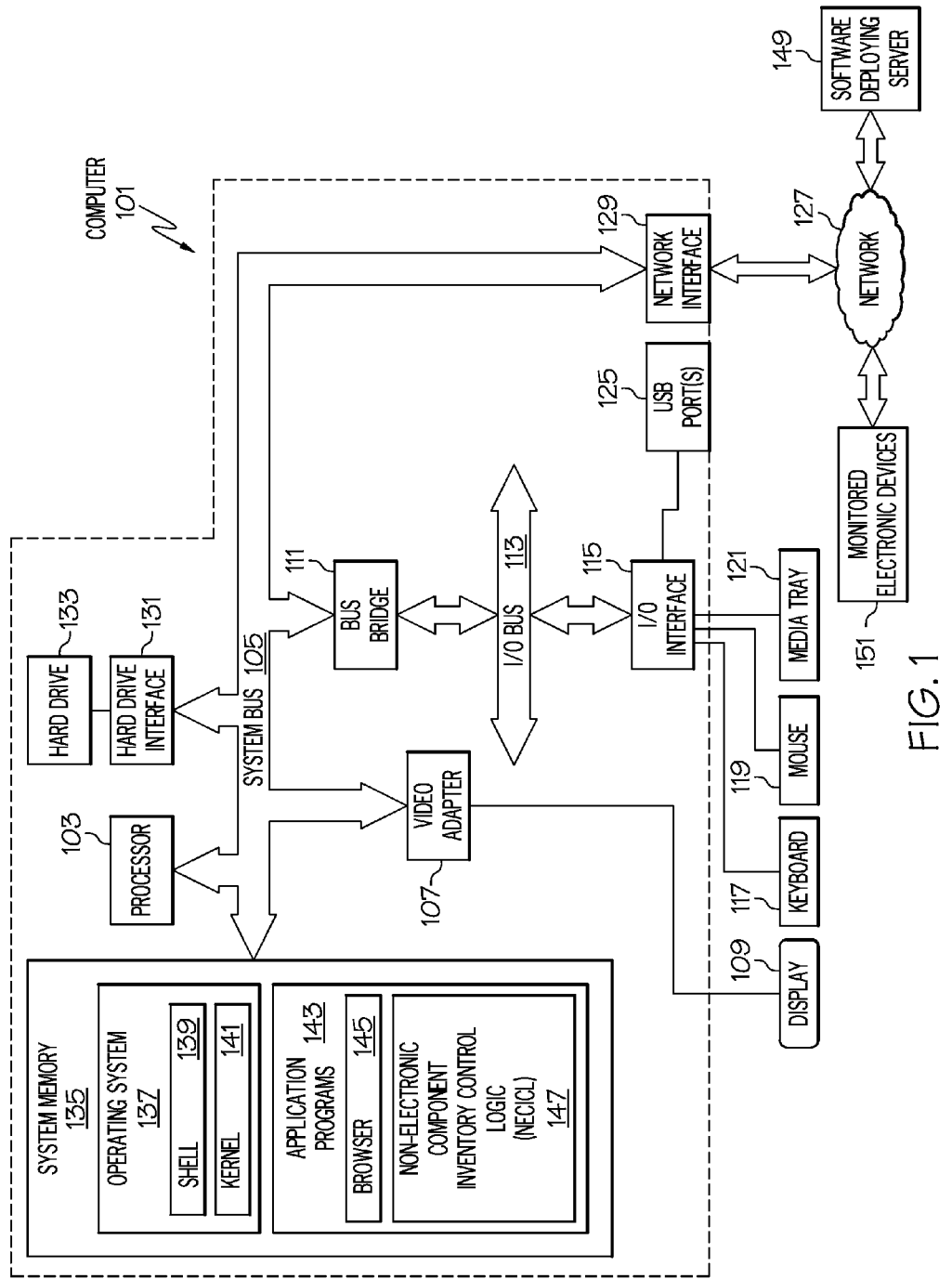
FIG. 1 depicts an exemplary system and network which may be used by one or more components of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 101 may be utilized by software deploying server 149, blade servers 204a-204n and/or service processor 208 and/or Baseboard Management Controller (BMC) 210 depicted in FIG. 2, integrated Management Module (iMM) 301 shown in FIG. 3, and/or Near Field Communication (NFC) emitter 405 shown in FIG. 4.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 using a network interface 129. Network interface 129 is a hardware network interface, such as a network interface card (NIC), etc. Network 127 may be an external network such as the Internet, or an internal network such as an Ethernet or a virtual private network (VPN).

A hard drive interface 131 is also coupled to system bus 105. Hard drive interface 131 interfaces with a hard drive 133. In one embodiment, hard drive 133 populates a system memory 135, which is also coupled to system bus 105. System memory 135 is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and/or other computer systems.

Application programs 143 in computer 101's system memory (as well as software deploying server 149's system memory) also include a Non-Electronic Component Inventory Control Logic (NECICL) 147. NECICL 147 includes code for implementing the processes described below, including those described and/or referenced in FIGS. 2-8. In one embodiment, the software NECICL 147 is preloaded into computer 101, such that it is executed during manufacturing prior to the installation of the operating system or other application programs. NECICL 147 can be stored in non-volatile memory associated with the operation of the iMM 301.

Note that the hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
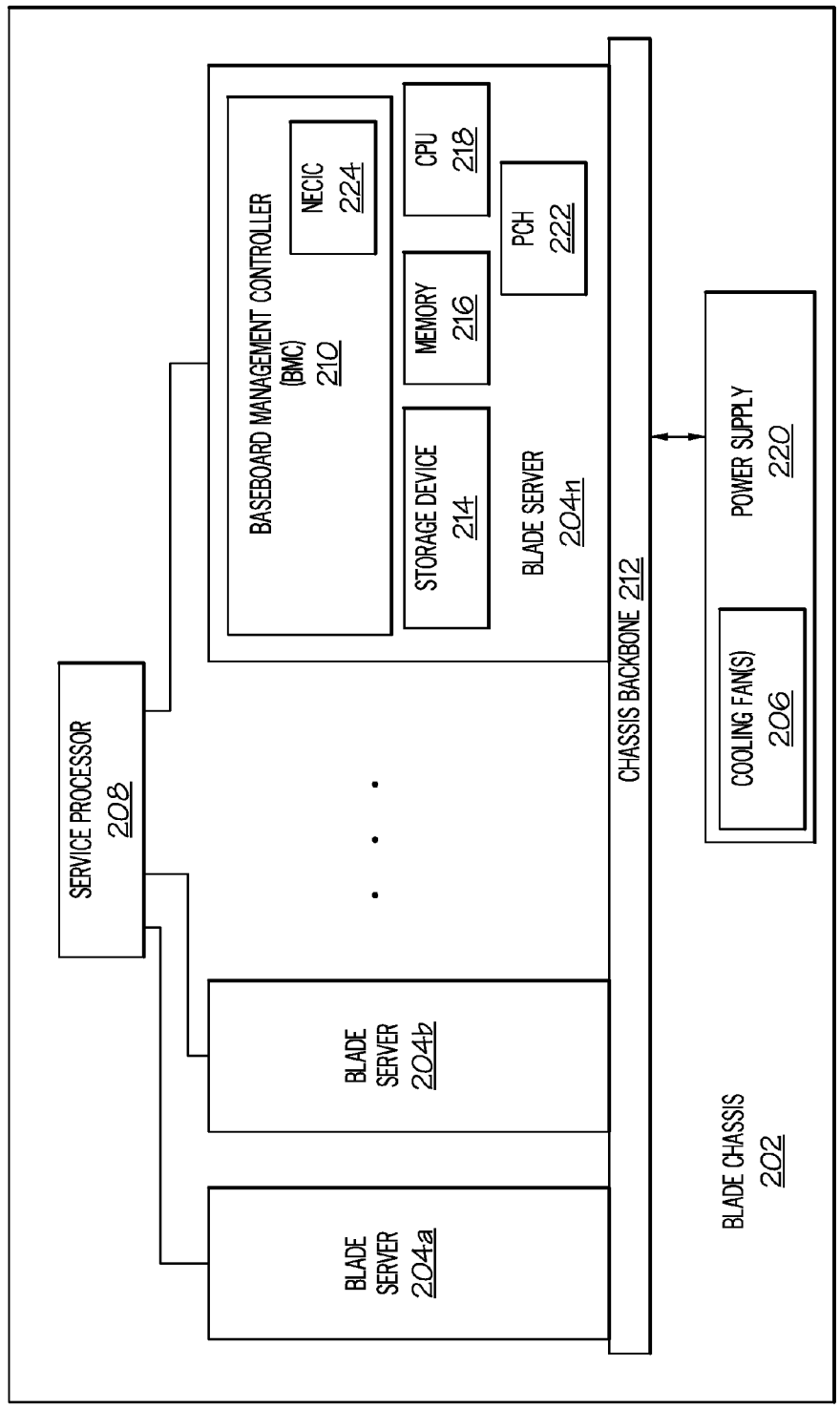
FIG. 2 illustrates an exemplary blade server chassis in which the present invention may be implemented.

With reference now to FIG. 2, an exemplary blade server chassis 202 in which one or more embodiments of the present invention may be implemented is presented.

Blade server chassis 202 contains one or more blade servers, depicted as blade servers 204a to 204n (where "n" is an integer), which are mounted on a chassis backbone 212, and which are powered by a power supply 220. In one embodiment, one or more of the blade servers 204 are cooled by one or more fans, such as the depicted cooling fan(s) 206.

Service Processor (SP) 208 is a hardware-based processor, also known as a management processor. Service processors, also known as management processors, work with hardware instrumentation and systems management software to provide problem notification and resolution (e.g., to indicate a conflict between what components should be within a particular blade server and what components are actually within that particular blade server). SP 208 also allows different blade servers from blade servers 204a-204n to communicate among themselves.

BMC 210 (a copy/version of which is found within each of the blade servers 204a-204n) is a specialized microcontroller on a motherboard, such as that found in blade server 204n. That is, BMC 210 manages an interface between system management software within blade server 204n and platform hardware found within blade server 204n. Thus, sensors (including the NFC receivers 303a-303b shown in FIG. 3) within the NECIC 224 (a hardware device) shown in blade server 204n, determine what non-electronic components are actually present within any particular blade server from blade servers 204a-204n.

In other words, BMC 210 is a specialized microcontroller that manages the overall health and environment of a blade server such as blade server 204n. This management includes both the monitoring as well as the control of cooling fans, power supplies, other hardware devices, as well as inventory of components and operations of components of blade server 204n, including both electronic component(s) as well as the non-electronic components 307a-307c shown in FIG. 3.

Figure 3:
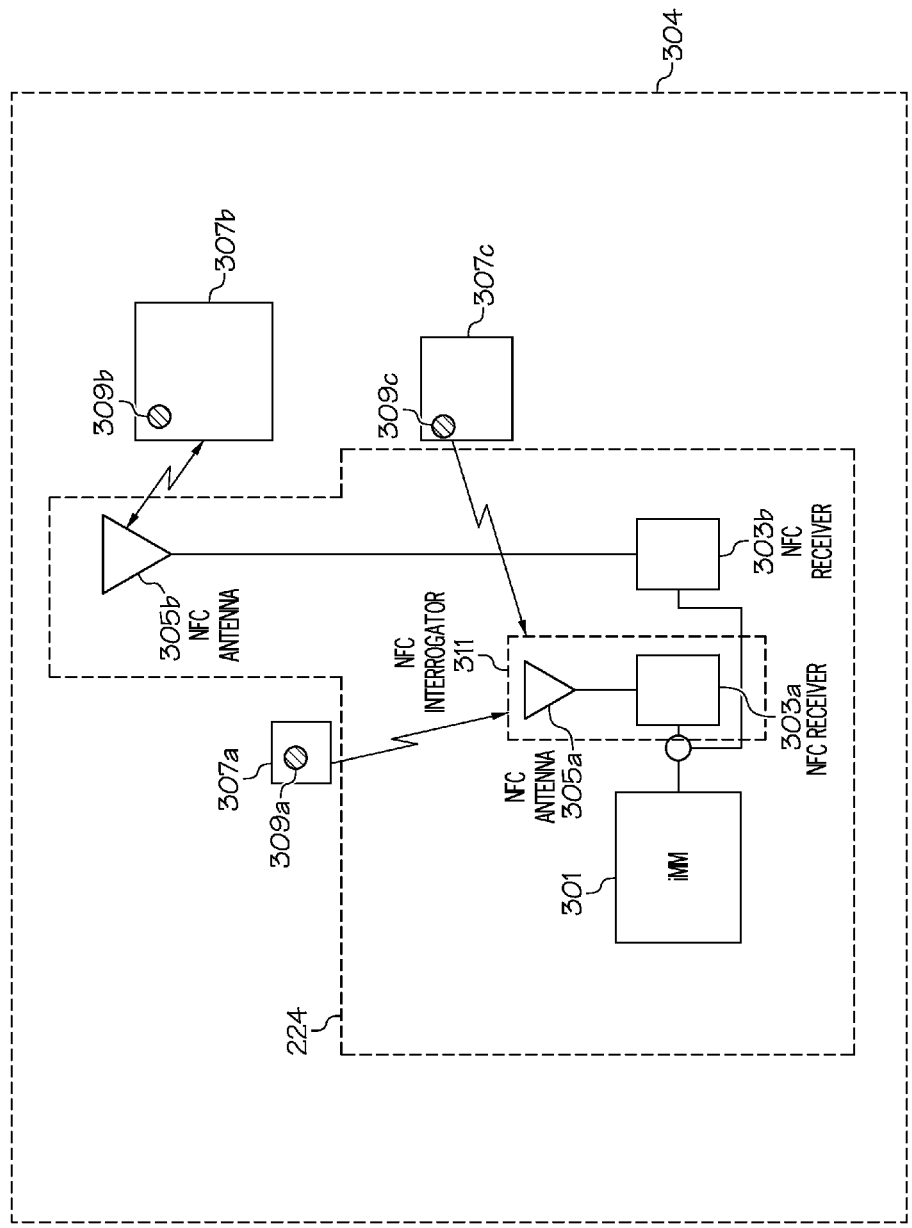
FIG. 3 depicts a relationship between an exemplary Non-Electronic Component Inventory Controller (NECIC) and one or more non-electronic components that are inventoried by the NECIC.

For purposes of clarity, the functions of the SP 208 and the BMC 210 are depicted as if SP 208 and BMC 210 are actually different components, which they are in one embodiment of the present invention. However, in a preferred embodiment of the present invention, exemplary blade server chassis 202 is actually managed by an integrated Management Module (iMM). This iMM, although not shown in FIG. 2, is depicted in FIG. 3 as iMM 301. An iMM a combination hardware device that performs the functions of (and replaces) the Service Processor (SP) 208 and the Baseboard Management Controller (BMC) 210 depicted in FIG. 2, as well as a non-depicted video controller, an Input/Output (I/O) interface, and a Remote Supervisor Adapter (RSA) for remotely controlling operations of a server. Thus, in a preferred embodiment an iMM performs the functions of not only the SP 208 and BMC 210 to control the blade servers 204a-204n shown in FIG. 2, but also controls the Near Field Communication (NFC) receivers 303a-303b and the NFC Electromagnetic Field (EMF) emitters 305a-305b shown in FIG. 3 as functional components of the hardware device Non-Electronic Component Inventory Controller (NECIC) 224 shown in FIG. 2.

Also within exemplary blade server 204n is a storage device 214, a memory 216, a Central Processing Unit (CPU) 218, and a Platform Control Hub (PCH) 222. Examples of storage device 214 include, but are not limited to, a hard disk drive, a flash drive, etc. Examples of memory 216 include, but are not limited to a Single In-line Memory Module (SIMM), a Dual In-line Memory Module (DIMM), etc. Examples of CPU 218 include, but are not limited to, a main processor, a multi-core processor, a co-processor, etc. PCH 222 is a chip that controls data paths, clocking, interfaces, etc. for one or more electronic components of blade server 204n, including but not limited to storage device 214, memory 216, and/or CPU 218.

Each of the blade servers 204a-204n shown in FIG. 2 is made up of both electronic components and non-electronic components. Examples of electronic components include, but are not limited to, processors, memory, intelligent busses, etc. Examples of non-electronic components include, but are not limited to, inert place holders for sockets, covers, air ducts, "dumb" wires, etc. Inventorying electronic components is achieved by a management device (e.g., the SP 208 and/or BMC 210 shown in FIG. 2) sending an electronic interrogation signal to the electronic components, directing them 1) to acknowledge their presence, and 2) to provide their identities. However, non-electronic devices are unable to send such messages, since they have no electronic features. The present invention overcomes this deficiency through the use of Near Field Communication (NFC) dots (such as the NFC dot 409 discussed below in reference to FIG. 4) located on all of the non-electronic components that are crucial to the correct operation of the server 204n.

With reference now to FIG. 3, a relationship is depicted between an exemplary Non-Electronic Component Inventory Controller (NECIC) 224 and one or more non-electronic components 307a-307c that are within an electronic device 304 and are inventoried by the NECIC 224. The non-electronic components 307a-307c are confined within the electronic device 304, such as the analogous blade servers 204a-204n shown in FIG. 2 (which also include electronic components).

As shown in FIG. 3, each of the non-electronic components 307a-307c has a Near Field Communication (NFC) dot (depicted as NFC dots 309a-309c) affixed thereto, since the non-electronic components 307a-307c are unable to generate electronic signals, including electronic identification signals, on their own.

Near Field Communication (NFC) refers to an NFC protocol (i.e., ISO/IEC 18000-3) and NFC-enabled devices that comport with the NFC protocol. NFC devices communicate over very short distances (e.g., 2-10 inches) using an NFC target device and an NFC interrogator. As shown in FIG. 4, an exemplary NFC target device is the depicted NFC dot 409. The NFC dot 409 is made up of an antennae 404 and an Integrated Circuit (IC) 406, which is a small memory device (e.g., capable of holding as little as 144 bytes of data).

An NFC Electromagnetic Field (EMF) emitter 405 emits an Electromagnetic Field (EMF) 410. When the NFC dot 409 is within the EMF 410 (e.g., within 2" of the NFC EMF emitter 405), a current is induced in the antenna 404, thus powering up the NFC dot 409, such that data stored within the IC 406 can be transmitted using the same antenna 404. That is, while the antenna 404 is too far away from the NFC EMF emitter 405 to be within the EMF 410, the NFC dot 409 remains inactive. However, if the NFC dot 409 is close enough to the NFC EMF emitter 405 (e.g., within 2") while the NFC EMF emitter 405 is powered up (thus emitting the EMF 410), then the NFC dot 409 goes active due to the induced current through the antenna 404. As such, the NFC dot 409 provides a means for transferring small amounts of data across limited short distances.

Returning now to FIG. 3, assume that an electronic device (e.g., one of the blade servers 204a-204n) shown in FIG. 2) has both electronic components as well as non-electronic components, depicted as non-electronic components 307a-307c.

For explanatory purposes, assume that non-electronic component 307a is a heat sink for a processor. Since a heat sink is just a piece of metal without any circuitry or other intelligence, a NFC identification device such as the depicted NFC dot 309a (analogous to the NFC dot 409 described in FIG. 4) is affixed to the heat sink (non-electronic component 307a), in order to identify the heat sink to the iMM 301 using an NFC interrogator 311. The NFC interrogator 311 includes an NFC antenna 305a and an NFC receiver 303a. The NFC antenna 305a acts both as an emitting antenna and a receiving antenna. That is, the NFC antenna 305a initially acts in a manner that is functionally analogous to the NFC EMF emitter 405 shown in FIG. 4 to produce the EMF 410. NFC antenna 305 also acts as a receiving antenna for receiving information generated by the NFC dot 309a. The NFC receiver 303a includes logic that is able to take in the identification data generated by the NFC dot 309a from the NFC antenna 305a, and transfer that identification data to the iMM 301.

Thus, the NFC antenna 305a first generates an EMF (e.g., 410 shown in FIG. 4), preferably in response to the iMM 301 powering up NFC antenna 305a within the NFC interrogator 311. Since the NFC dot 309a is within range (e.g., within 2") of the NFC EMF emitter (i.e., NFC antenna 305a), the NFC dot 309a becomes active (i.e., current is induced in the antenna 404 shown in FIG. 4), such that data within the NFC dot 309a is transmitted from the IC 406 (via the antenna 404) to the NFC antenna 305a now acting as a receiving antenna. This data (i.e., data that provides the identity and/or characteristics/abilities of the non-electronic component 307a) is sent from the NFC antenna 305a to the NFC receiver 303a, which forwards the data on to the iMM 301. The iMM 301 is therefore able to determine the presence, features, and/or location of the non-electronic component 307a within the electronic device.

Similarly, non-electronic component 307c (e.g., a piece of duct work within a blade server) is also within range (e.g., within 2") of the NFC antenna 305a. As such, the NFC antenna 305a can activate the NFC dot 309c that is affixed to the duct work, thus providing identification information (name, characteristics, location, etc.) about that duct work within the blade server.

As shown in FIG. 3, non-electronic component 307b (e.g., a cover or other housing for a blade server) is too far (e.g., more than 2") from the NFC antenna 305a, and therefore cannot be activated/interrogated by NFC antenna 305a. However, non-electronic component 307b is within range (e.g., within 2") of NFC antenna 305b, which is able to activate/interrogate the NFC dot 309b that is affixed to the cover/housing (non-electronic component 307b).

Figure 5:
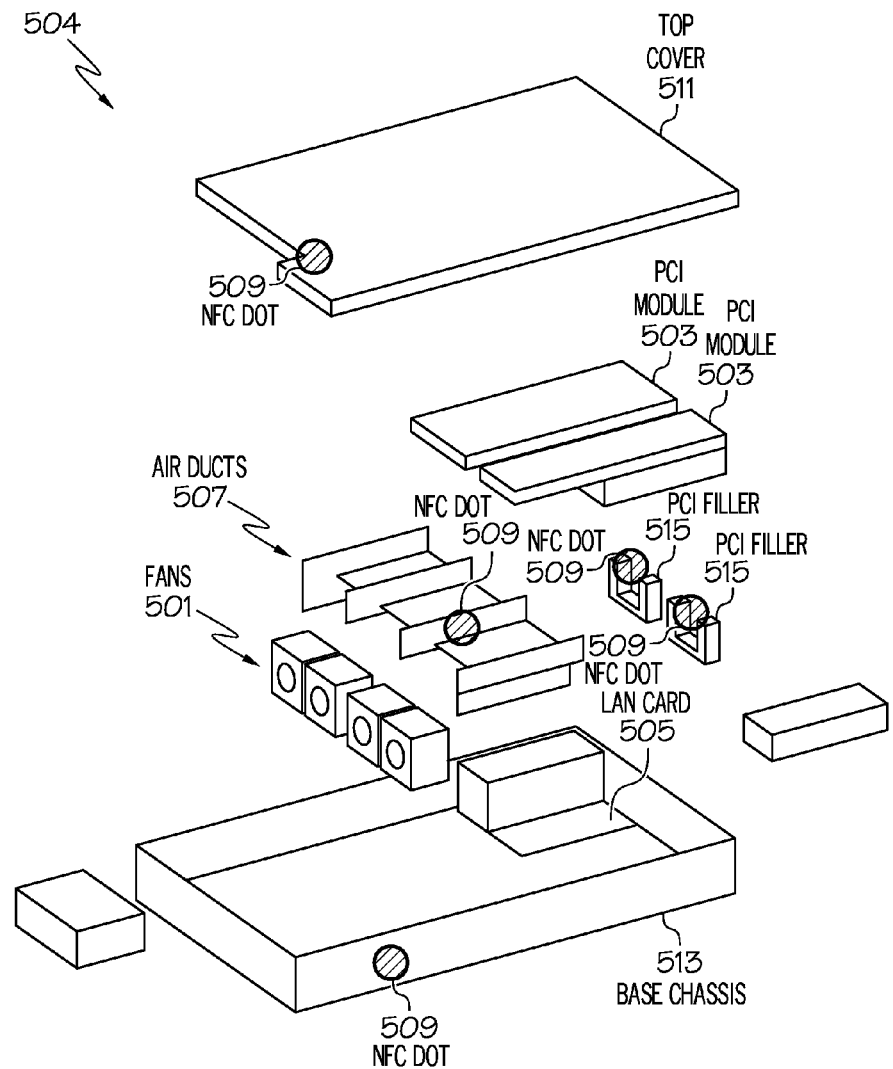
FIG. 5 illustrates an exemplary server having both electronic and non-electronic components, where the non-electronic components are tagged with Near Field Communication (NFC) dots.

With reference now to FIG. 5, an exploded view of an exemplary blade server 504 (analogous to one or more of the blade servers 204a-204n shown in FIG. 2) having both electronic and non-electronic components is presented. The blade server 504 has multiple electronic components, such as the bank of four onboard fans 501, a Peripheral Component Interface (PCI) module 503 (e.g., a PCI module that performs a specific electronic function such as that of an audio card), and a Local Area Network (LAN) card 505, for accessing a LAN. These electronic devices all have internal logic that allows them to generate electronic signals/messages that identify themselves to an iMM/BMC.

However, within the blade server 504 are passive/inert/non-electronic components, such as the air ducts 507 (which are physical structures that direct air to and from the fans 501), a PCI filler 515 (i.e., a "dummy" component that is inserted into a PCI slot in order to protect and/or reserve that PCI slot), as well as the housing components (the top cover 511 and the bottom base chassis 513) that provide an enclosure for the blade server 504. Since these non-electronic components do not have the intelligence/circuitry to generate their own identification electronic signals, each have affixed thereto one of the NFC dots 509 (each of which is analogous to NFC dot 409 shown in FIG. 4). Each NFC dot generates a unique signature for the non-electronic device to which it is affixed. Thus, even if there are multiple components of the same basic part number, such as two of the same heat sink required for the processors, each heat sink will have a different NFC identification dot as shown in 609a and 609b in FIG. 6.

For example, consider the two heat sinks 607a-607b shown in FIG. 6. Heat sink 607a has an NFC dot 609a affixed to it, which can produce an identification (e.g., Part Number—PN123456a) electronic signal. Heat sink 607b has an NFC dot 609b affixed to it, which can produce another identification (e.g., PN123456b) electronic signal. Note that the two heat sinks 607a-607b may be the same make and model of heat sinks, or they may be different makes or models of heat sinks.

Thus, as depicted in FIG. 2-FIG. 6, one or more embodiments of the present invention describe a system (e.g., a blade server) that has one or more non-electronic components (e.g., elements 507, 511, 513, 515 shown in FIG. 5). The system also has one or more Near Field Communication (NFC) identification chips (e.g., NFC dots 509 shown in FIG. 5), where each of the NFC identification chips is affixed to a specific non-electronic component from the one or more non-electronic components. A non-electronic component inventory controller (e.g., NECIC 224 shown in FIG. 2) identifies the non-electronic components in the system by interrogating the NFC identification chips, which are affixed to the non-electronic components, with an NFC electromagnetic field that is emitted from an NFC emitter.

In one or more embodiments of the present invention, a comparison logic (e.g., part of NECICL 147 shown in FIG. 1) compares a table of non-electronic components that are designed components of the system (e.g., table 701 in FIG. 7) with non-electronic components that are identified by the NFC identification chips as actually being present within the system, thereby producing the table 703. A fault message generator (e.g., part of the iMM 301 shown in FIG. 3) generates a fault message on a display in response to the designed components of the system failing to match the non-electronic components that are identified by the NFC identification chips.

In one or more embodiments of the present invention, the electronic devices are monitored by a monitoring system. For example, computer 101 shown in FIG. 1 may be monitoring the electronic and non-electronic components found in server blades such as the monitored electronic devices 151 shown in FIG. 1. The computer 101 can thus take information regarding what electronic/non-electronic components are actually within the blade servers (monitored electronic devices 151) from the iMM residing within each blade server, and direct the manufacturing assembly line accordingly if a non-electronic component is missing or incorrect (i.e., the wrong non-electronic component has been installed).

In one or more embodiments of the present invention, a management controller (i.e., the iMM 301 shown in FIG. 3 or the BMC 210 shown in FIG. 2) manages electronic and non-electronic components within the system. As described herein, the non-electronic component inventory controller is a component of the management controller.

In one or more embodiments of the present invention, the system also includes an enclosure (e.g., elements 511 and 513 shown in FIG. 5) around the electronic system. This enclosure confines the NFC electromagnetic field from the NFC dot to stay within the enclosure.

In one or more embodiments of the present invention, the system is a blade server (or a stand-alone server), and the non-electronic components within the blade server are from a group consisting of a server cover (elements 511 and 513 in FIG. 5), a heat sink (elements 609a-609b in FIG. 6) on a processor (elements 607a-607b in FIG. 6), an air duct (element 507 in FIG. 5), and a chip slot filler (element 515 in FIG. 5). While these non-electronic components are exemplary, it is understood that any non-electronic component can likewise be identified by NFC dots as described herein.

In one or more embodiments of the present invention, the information presented by the NFC dots described herein is thus available when testing and/or configuring an electronic system (e.g., a blade server). That is, an NFC dot not only identifies the existence of a particular non-electronic component, but also identifies the electronic component that it supports.

Thus, during the test phase of the system (e.g., a blade server), the system design engineer (or an intelligent system using information from a Basic Input/Output System—BIOS chip) can generate a table of the vital product data for all the possible electronic components that can be installed in the system. The engineer/system will then match the associated NFC dots on the passive components with the electronic components. The table 701 in FIG. 7 presents an exemplary table that is so generated.

When AC power is applied on for the first time, only standby power to the iMM will be activated. Thereafter, the iMM will read the vital product data for all the electronic components installed in the system. From this information the iMM will determine the correct set of passive components that need to be installed in the server based on the vital product data it gathered. The iMM will then use the NFC interrogation system described herein to read the NFC dots installed on all of the passive (non-electronic) components. The iMM will then match the NFC dots (and thus the non-electronic components) to the electronic components, thus generating the table 703 shown in FIG. 7. As shown in FIG. 7, the non-electronic component "Heat sink Type 2" for one of the 130 W processors is missing its processor baffle (i.e., a duct that funnels air to the heat sink). From this information, the iMM can send information to the manufacturing line indicating that there is an incorrect passive-to-electronic component installation. An alert can be sent to the manufacturing technician notifying the technician that an electronic component is missing (or has the wrong) passive (non-electronic) component attached to or otherwise associated with it.

Figure 8:
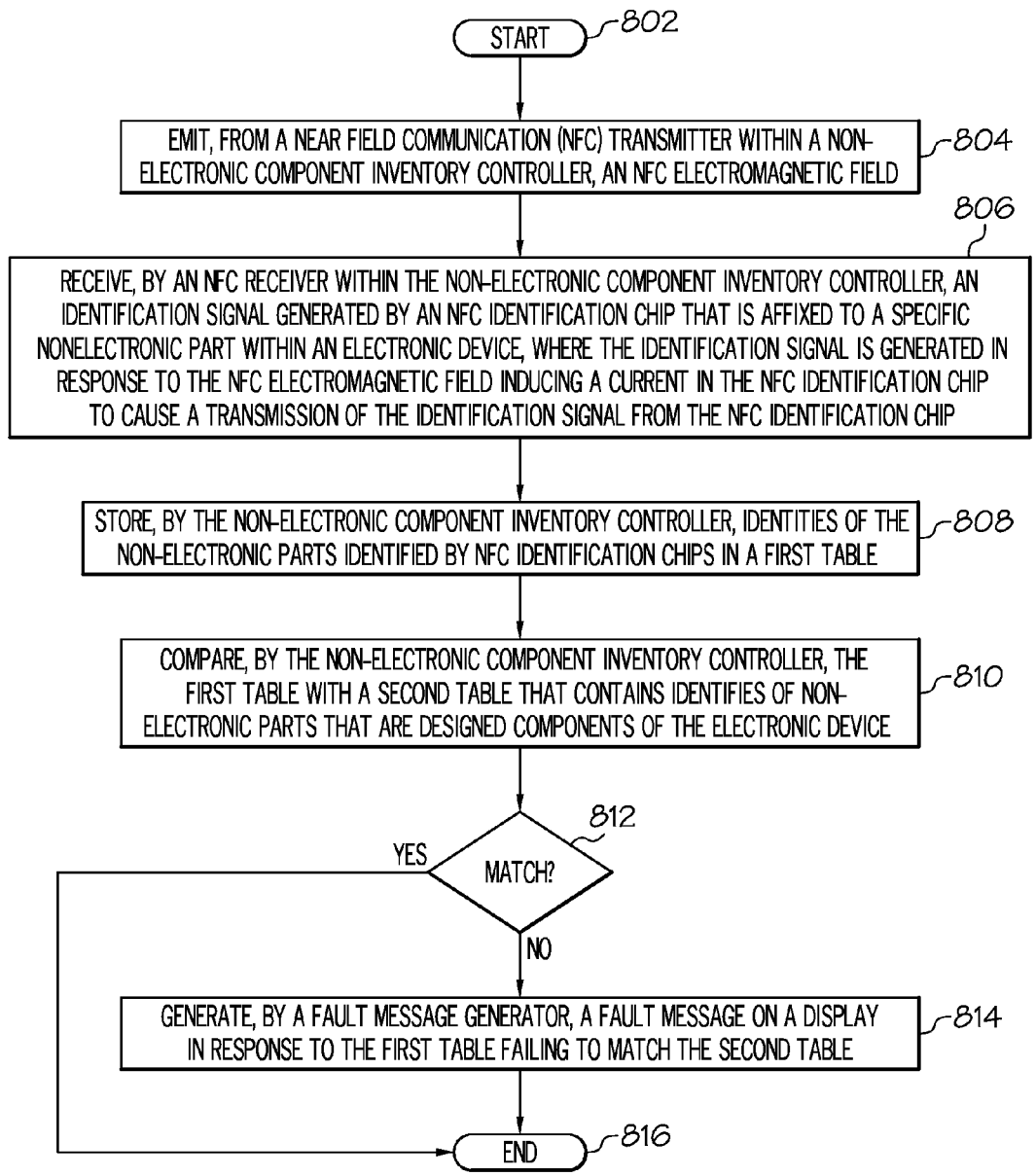
FIG. 8 is a high level flow chart of one or more exemplary steps taken by one or more processors and/or other hardware devices to inventory non-electronic components of an electronic system.

With reference now to FIG. 8, a high level flow chart of one or more exemplary steps taken by one or more processors and/or other hardware devices to inventory non-electronic components of an electronic system is presented.

After initiator block 802, a Near Field Communication (NFC) electromagnetic field emitter (e.g., NFC antenna 305a in FIG. 3) within a non-electronic component inventory controller (e.g., NECIC 224 in FIG. 3) emits an NFC electromagnetic field (e.g., EMF 410 shown in FIG. 4), as described in block 804. As described herein, the non-electronic component inventory controller inventories non-electronic components of the electronic device.

As described in block 806, an NFC receiver (e.g., NFC antenna 305a and NFC receiver 303a shown in FIG. 3) within the non-electronic component inventory controller receives an identification signal. This identification signal is generated by an NFC identification chip (e.g., NFC dot 309a shown in FIG. 3), which is affixed to a specific non-electronic component (e.g., element 307a shown in FIG. 3) within an electronic device. As described herein, the identification signal is generated in response to the NFC electromagnetic field inducing a current in the NFC identification chip to cause a transmission of the identification signal from the NFC identification chip.

As described in block 808, the non-electronic component inventory controller stores identities of the non-electronic components identified by NFC identification chips in a second table (e.g., table 703 shown in FIG. 7). The first table has already been generated and is a table in the NECICL 147 application specified for this particular server, and identifies which electronic components within the electronic device are designed to be coupled to particular non-electronic components.

As described in block 810, the non-electronic component inventory controller compares the first table with a second table that contains identities of non-electronic components that are designed components of the electronic device.

As described in query block 812, a determination is made as to whether or not the two tables match based on the electronic components installed in the server 204n. If not, then a fault message generator generates a fault message on a display (block 814).

The flow-chart ends at terminator block 816.

In one embodiment of the present invention, the electronic device is being assembled on an assembly line, and the method further includes transmitting the fault message to the assembly line, such that the fault message identifies a missing non-electronic component and an electronic component to which the missing non-electronic component is to be coupled with.

In one embodiment of the present invention, the NFC electromagnetic field is confined within the enclosure around the electronic device. Thus, erroneous readings from NFC dots in other devices (e.g., nearby blade servers) are not generated.

As described herein, the present invention is able to identify non-electronic passive components in a server product. With this information, the BMC (or iMM) can then determine if the server is properly manufactured, and generate an error indication if it is not, thereby avoiding any problems at the customer site.

While the present invention has been described in the context of a server chassis, the processes and system described herein may also be applied to a server in a stand-alone rack.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A system comprising:
   one or more non-electronic components, each having a unique Near Field Communication (NFC) identification chip affixed thereto;
   an NFC emitter; and
   a non-electronic component inventory controller, wherein the system is a blade server within a blade chassis, wherein the non-electronic components are in the blade server, and wherein the non-electronic components are one or more components from a group consisting of a server cover, a heat sink on a processor, an air duct, and a chip slot filler.

2. The system of claim 1, further comprising:
   comparison logic that compares a table of all potential non-electronic components that are designed to be components of the system with non-electronic components that are identified by the NFC identification chips as actually being present within the system; and
   a fault message generator, wherein the fault message generator generates a fault message on a display in response to the designed components of the system failing to match the non-electronic components that are identified by the NFC identification chips.

3. The system of claim 1, further comprising:
   a management controller, wherein the management controller manages electronic and non-electronic components within the system, and wherein the non-electronic component inventory controller is a component of the management controller.

4. The system of claim 1, further comprising:
   an enclosure around the system, wherein an NFC electromagnetic field generated by the NFC emitter is confined within the enclosure.

5. The system of claim 1, wherein the NFC identification chips are NFC dots.

6. A method of inventorying non-electronic components of an electronic device, the method comprising:
   receiving, by a Near Field Communication (NFC) receiver within a non-electronic component inventory controller, an identification signal, wherein the identification signal is generated by an NFC identification chip, wherein the NFC identification chip is affixed to a specific non-electronic component within an electronic device, and wherein the identification signal is generated in response to an NFC electromagnetic field inducing a current in the NFC identification chip to cause a transmission of the identification signal from the NFC identification chip; and
   inventorying, by a non-electronic component inventory controller, non-electronic components of the electronic device according to received identification signals, wherein the electronic device is a blade server within a blade chassis, wherein the non-electronic components are in the blade server, and wherein the non-electronic components are one or more components from a group consisting of a server cover, a heat sink on a processor, an air duct, and a chip slot filler.

7. The method of claim 6, wherein the NFC electromagnetic field is emitted from an NFC electromagnetic field emitter.

8. The method of claim 6, further comprising:
storing, by the non-electronic component inventory controller, identities of the non-electronic components identified by NFC identification chips in a first table, wherein the first table identifies all electronic components within the electronic device that are designed to be coupled to particular non-electronic components.

9. The method of claim 8, further comprising:
comparing, by the non-electronic component inventory controller, the first table with a second table that contains identities of non-electronic components that are designed components of the electronic device; and
generating, by a fault message generator, a fault message on a display in response to the first table failing to match the second table.

10. The method of claim 9, wherein the electronic device is being assembled on an assembly line, and wherein the method further comprises:
transmitting the fault message to the assembly line, wherein the fault message identifies a missing non-electronic component and an electronic component to which the missing non-electronic component is to be coupled with.

11. The method of claim 6, wherein the NFC electromagnetic field is confined within the enclosure around the electronic device.

12. The method of claim 6, wherein NFC identification chips are NFC dots.

13. A computer program product for inventorying non-electronic components in an electronic device, the computer program product comprising a computer readable storage medium having program code embodied therewith, wherein the computer readable storage medium is not a transitory signal per se, and wherein the program code is readable and executable by a processor to perform a method comprising:
emitting, from a Near Field Communication (NFC) electromagnetic field emitter within a non-electronic component inventory controller, an NFC electromagnetic field, wherein the non-electronic component inventory controller inventories non-electronic components of the electronic device, wherein the electronic device is a blade server within a blade chassis, wherein the non-electronic components are in the blade server, and wherein the non-electronic components are one or more components from a group consisting of a server cover, a heat sink on a processor, an air duct, and a chip slot filler; and
receiving, by an NFC receiver within the non-electronic component inventory controller, an identification signal, wherein the identification signal is generated by an NFC identification chip, wherein the NFC identification chip is affixed to a specific non-electronic component within an electronic device, and wherein the identification signal is generated in response to the NFC electromagnetic field inducing a current in the NFC identification chip to cause a transmission of the identification signal from the NFC identification chip.

14. The computer program product of claim 13, wherein the method further comprises:
storing, by the non-electronic component inventory controller, identities of the non-electronic components identified by NFC identification chips in a first table, wherein the first table identifies which electronic components within the electronic device are designed to be coupled to particular non-electronic components.

15. The computer program product of claim 14, wherein the method further comprises: comparing, by the non-electronic component inventory controller, the first table with a second table that contains identities of non-electronic components that are designed components of the electronic device; and
generating, by a fault message generator, a fault message on a display in response to the first table failing to match the second table.

16. The computer program product of claim 13, wherein the NFC identification chips are NFC dots.

* * * * *